United States Patent
Roy et al.

(10) Patent No.: US 6,516,397 B2
(45) Date of Patent: Feb. 4, 2003

(54) VIRTUAL MEMORY SYSTEM UTILIZING DATA COMPRESSION IMPLEMENTED THROUGH A DEVICE

(75) Inventors: Sumit Roy, Menlo Park, CA (US); Rajendra Kumar, Los Altos, CA (US); Milos Prvulovic, Bogard (YU); Kenneth Mark Wilson, San Jose, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 148 days.

(21) Appl. No.: 09/829,496

(22) Filed: Apr. 9, 2001

(65) Prior Publication Data

US 2002/0147893 A1 Oct. 10, 2002

(51) Int. Cl.$^7$ .............................................. G06F 12/00
(52) U.S. Cl. ..................... 711/170; 711/173; 711/159; 709/321; 709/247
(58) Field of Search ................................ 711/170, 173, 711/159; 709/321, 247; 710/68; 708/203

(56) References Cited

U.S. PATENT DOCUMENTS

| | | | | |
|---|---|---|---|---|
| 5,394,534 A | * | 2/1995 | Kulakowski et al. | 711/112 |
| 5,479,587 A | * | 12/1995 | Campbell et al. | 385/1.17 |
| 5,559,978 A | * | 9/1996 | Spilo | 711/203 |
| 5,699,539 A | * | 12/1997 | Garber et al. | 711/2 |
| 6,002,814 A | * | 12/1999 | Chadez | 382/303 |
| 2001/0038642 A1 | * | 11/2001 | Alvarez et al. | 370/477 |
| 2002/0097917 A1 | * | 7/2002 | Nelson et al. | 382/239 |
| 2002/0161932 A1 | * | 10/2002 | Herger et al. | 709/321 |

* cited by examiner

Primary Examiner—Hong Kim

(57) ABSTRACT

A method of operating a data processing system having a main memory divided into memory pages that are swapped into and out of main memory when the main memory becomes short. The data processing system has an operating system that sends page store commands specifying memory pages to be stored in a swap file and page retrieve commands specifying memory pages to be retrieved from the swap file and stored in the main memory. The present invention provides a swap driver that utilizes compression code for converting one of the memory pages that is to be swapped out of main memory to a compressed memory page. The data processing memory includes a compressed page region that is used to store the compressed memory pages. A page table in the compressed page region specifies the location of each compressed page and the page address corresponding to that page. The swap driver compresses at least one of the memory pages specified in one of the page store commands to provide a corresponding compressed memory page and causes that compressed memory page to be stored in the compressed page region. The swap driver also searches the page table for a page identified in one of the retrieve commands. The swap driver causes that page to be moved to a corresponding area of main memory after decompressing the page if the swap driver finds an entry in the page table indicating that the page is stored in the compressed page region.

10 Claims, 3 Drawing Sheets

VIRTUAL MEMORY SYSTEM UTILIZING DATA COMPRESSION IMPLEMENTED THROUGH A DEVICE

FIELD OF THE INVENTION

The present invention relates to computer systems, and more particularly, to an improved method for implementing virtual memory.

BACKGROUND OF THE INVENTION

A data processing system typically consists of a processor, a volatile memory for storing instructions and data, and some form of permanent storage i.e. a magnetic disk. Due to ever increasing sizes in application programs, operating systems use virtual memory to extend the visible size of the real random access memory (RAM) by backing it with a region on a permanent storage device (Swap file or device). This procedure also allows multitasking systems to run multiple processes on the machine, where each process can be given access to the complete virtual address space of the processor. The address space is divided into page frames which are typically fixed in size. A translation mechanism is used to convert the virtual address issued by a running process to the physical page that contains the instructions or data required by the process. When the system runs low on physical pages, it writes less active pages to a permanent storage medium like a hard disk. The area of the disk reserved for this purpose is called the swap device or swap file. The newly freed page frame can now be supplied to this or another process.

However, if the page that was written to disk must be accessed, it has to be explicitly fetched from the swap device and put into a free physical page frame. This disk access is multiple orders of magnitude slower than direct memory access, i.e., tens of milliseconds for disk access versus tens of nanoseconds for access to memory. The operating system can try to hide the latency of this disk access by switching to another runnable process, or by aggressively prefetching pages from disk. In many environments, such as an engineering workstation dedicated to one main task (EDA/CAD/CAM), there may not be another process that can be run to hide disk access latencies. Prefetching of pages from disk will work perfectly only if the system can exactly predict the page reference pattern of the application. This is not possible or prohibitively expensive in terms of computational resources for the general case.

One method that has been suggested to enhance the performance of virtual memory systems utilizes compression techniques to increase the amount of data and/or code that can be kept in RAM. Data tends to have high redundancy once it is moved into RAM. This observation may be due to the occurrence of large runs of similar numbers in case of scientific code, or finite size vocabularies in case of text or databases. The executable code that is normally held in virtual memory also tends to be highly redundant since it consists of sequences of computer instructions. Hence, the space needed to store this material can be substantially reduced by utilizing data compression algorithms. A section of data and/or code that was too large to fit into RAM in its normally executable form may fit into the same RAM space in its compressed form. Sections of the compressed data and/or code can then be decompressed and sent to the computer process requesting the information without swapping information back and forth to a swap file.

Unfortunately, the prior art systems based on data compression require that the operating system kernel be modified, which is a complex and expensive process. This also requires customers to do significant software upgrades to their existing computers.

Prior art systems that utilize hardware compression engines in the memory path to improve performance have also been suggested. These systems not only require that the computer operating system be modified, but also that changes be made to the computer hardware. Hence, these systems are also unsuitable for the large installed base of engineering workstations. In addition, systems based on hardware compression cannot be easily changed to take advantage of particular compression algorithms that might provide significantly better compression with one type of program that is used on a particular system.

Broadly, it is the object of the present invention to provide an improved virtual memory system for use in data processing systems and the like.

It is a further object of the present invention to provide a virtual memory system that does not require that the operating system kernel be altered.

It is a still further object of the present invention to provide a virtual memory system that can utilize a variety of different compression algorithms.

These and other objects of the present invention will become apparent to those skilled in the art from the following detailed description of the invention and the accompanying drawings.

SUMMARY OF THE INVENTION

The present invention is a method of operating a data processing system having a main memory divided into memory pages that are swapped into and out of main memory when main memory becomes short. The data processing system has an operating system that sends "page store" commands specifying memory pages to be stored in a swap file and "page retrieve" commands specifying memory pages to be retrieved from the swap file and stored in the main memory. The present invention provides a swap driver that utilizes compression code for converting one of the memory pages that is to be swapped out of main memory to a compressed memory page. The data processing system's memory includes a compressed page region that is used to store the compressed memory pages. A page table in the compressed page region specifies the location of each compressed page and the page address corresponding to that page. The swap driver compresses at least one of the memory pages specified in one of the page store commands to provide a corresponding compressed memory page and causes that compressed memory page to be stored in the compressed page region. The swap driver also searches the page table for a page identified in one of the retrieve commands. The swap driver causes that page to be moved to a corresponding area of main memory after decompressing the page if the swap driver finds an entry in the page table indicating that the page is stored in the compressed page region. In the preferred embodiment of the present invention, the compression code includes a plurality of compression algorithms, and the swap driver determines which of the algorithms provides the most compression for each page. In this embodiment, the page table also stores information specifying the compression algorithm used to compress each stored compressed page. If there is insufficient space in the compressed page region to store one of the compressed memory pages, the swap driver causes one of the compressed memory pages stored in the compressed page region to be moved to an auxiliary storage device.

DETAILED DESCRIPTION OF THE INVENTION

Figure 1:
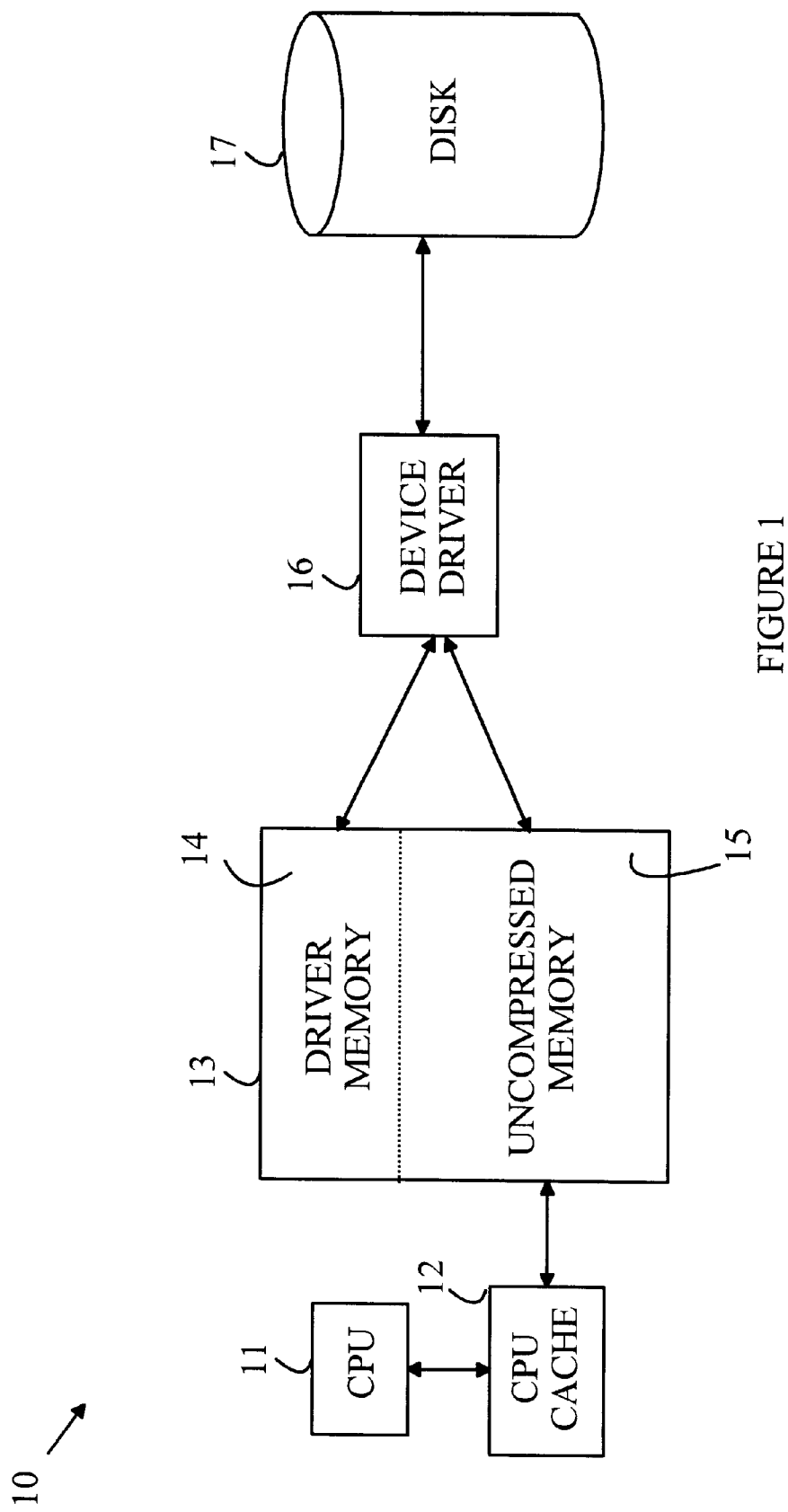
FIG. 1 is a block diagram of a computer system 10 that utilizes a virtual memory system according to the present invention.

The present invention may be more easily understood with reference to FIG. 1, which is a block diagram of a computer system 10 that utilizes a virtual memory system according to the present invention. Computer system 10 includes a central processing unit (CPU) 11 that executes instructions that are fetched from a cache 12. Cache 12 is loaded from the uncompressed portion 15 of a main memory 13 that is divided into an uncompressed area and a driver memory 14. The driver memory is used by device driver 16 to store compressed data. Driver 16 presents itself as a swap partition to the operating system. When the operating system tries to swap out a page, it will initiate a write on this special swap device. The device driver intercepts the page and compresses it. It then copies the compressed page to the previously reserved driver memory area 14. When the process tries to access the page sometime in the future, the operating system issues a read request to the swap device. The device driver intercepts this read request and decompresses the page. The decompressed page is then stored in the uncompressed portion of the memory where it is accessed by CPU 11. Since decompression of a page is much faster than reading data from a disk, this scheme substantially reduces the total execution time for the application.

The present invention utilizes a driver to implement the compression scheme because essentially all operating systems of interest provide a mechanism for installing device drivers without modifying the operating system kernel. Hence, the present invention does not require any modification to the operating system and can be easily installed in a wide variety of platforms without extensive system modifications. For the purposes of this discussion, a swap driver will be defined as a section of code that receives commands from the operating system to fetch or store a page from a swap device. In conventional operating systems that utilize swap files, a simple driver receives store commands indicating that a specific page in memory is to be swapped to disk and retrieve commands indicating that a page that is stored on disk is to be retrieved. The present invention can be used to replace this driver.

Figure 2:
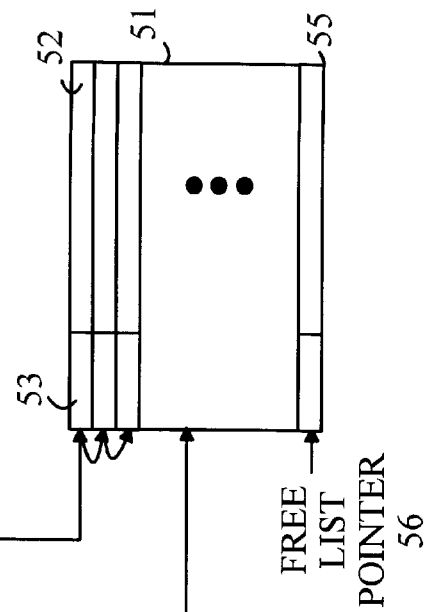
FIG. 2 is a block diagram of the driver memory area that is divided into a page table area and a compressed data area.

In the preferred embodiment of the present invention, the driver memory is allocated based on a load time parameter provided by the user. Alternatively, a preset percentage of the available RAM may be allocated. The driver memory is preferably divided into a table area indexed by page number as shown at 45 and compressed data area as shown in FIG. 2, which is a block diagram of the driver memory area. The compressed data area 51 is preferably divided into a bucket chain comprised of fixed size "buckets" 52, typically 256 Bytes in length. The buckets are chained together into a linked list. A header 53 in each bucket points to the next bucket in the current chain. The free buckets are chained together and to a first bucket 55 whose address is maintained in a free list pointer 56.

The size of swap file that this device represents is also specified at load time. This value is used to create a page table 41, with one entry per page. The page table entry includes a pointer 42 to the start of the bucket chain in which the compressed page corresponding to that entry is held. If the page in question is held on disk, a special entry indicating where on the disk it is held is stored in space normally utilized for the pointer. Each page entry also includes an entry 44 specifying the size of the compressed page. As another implementation of the present invention, the driver supports multiple bucket sizes so as to reduce the amount of memory wasted when a compressed file does not fit exactly into an integral number of buckets.

The amount of memory required to store a compressed page depends on the contents of the page as well as the memory compression algorithm. For example, an algorithm designed to compress computer code would not be expected to provide optimum compression for data representing a line drawing. Accordingly, the preferred embodiment of the present invention provides multiple memory compression algorithms, and switches between these algorithms at runtime. The actual memory compression algorithm used for a page is encoded in the page table entry as shown at 43. In the preferred embodiment of the present invention, only a small part of the page is compressed with the current algorithm to determine the quality of the compression. If the compression ratio achieved is too low, either another algorithm is tried or the page is stored in an uncompressed form, and the compression algorithm identification is set to a value indicating that the page is not compressed.

Each time a page is transferred to the swap driver of the present invention, the driver must decide which compression algorithm to utilize. The first time the page in question is encountered, the driver can try all of the algorithms to determine the optimum algorithm. If the page is encountered a second time, the driver already knows the algorithm that performed the best on the previous swap operation. Hence, the swap driver preferably tests this algorithm first. If this algorithm provides satisfactory compression, the remaining algorithms do not need to be tested. Alternatively, the swap driver can test the other algorithms as well to assure that the contents of the page have not changed in a manner that renders the page more compressible by another algorithm. In this regard, it should be noted that storage without compression is equivalent to another "compression" algorithm, albeit, with very poor compression. Accordingly, the term "compression algorithm" shall be deemed to include the no compression case unless the context indicates otherwise.

If the compression achieved for a large number of pages is very poor, there may not be enough memory reserved to store them. If the driver cannot allocate more memory because the system is already under severe memory pressure, then the driver starts to write compressed pages to disk. In the preferred embodiment of the present invention, the driver maintains a "history" of the pages that have been accessed and the number of times each page has been accessed as shown at 46 in FIG. 2. The driver uses this history to determine which pages are the less frequently used pages. These pages are then written to an auxiliary storage area, which is typically a disk drive such as that shown at 17 in FIG. 1.

Figure 3:
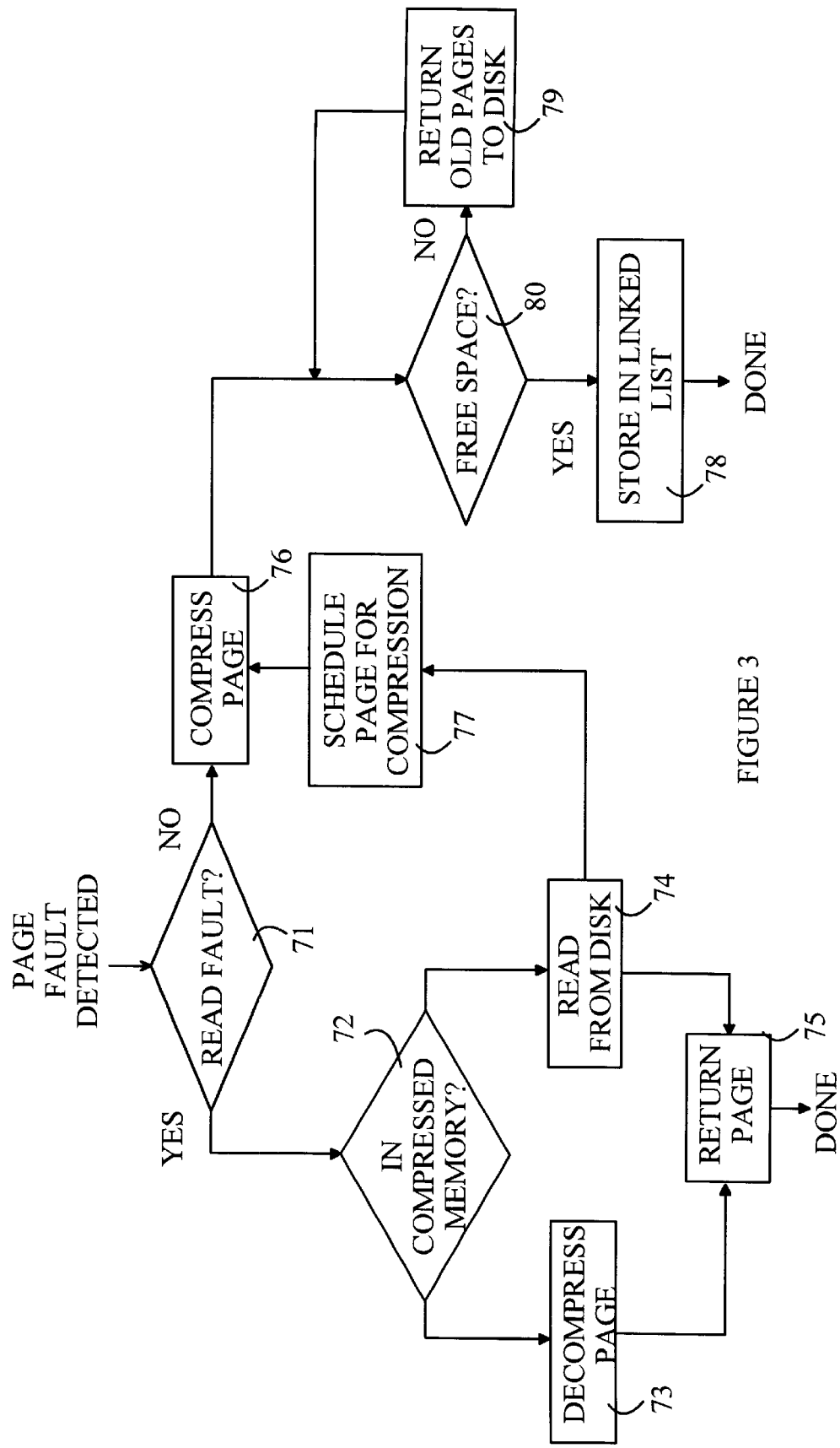
FIG. 3 is a flow chart of one embodiment of a swap driver according to the present invention.

Refer now to FIG. 3, which is a flow chart of one embodiment of a swap driver according to the present invention. When the operating system detects a page fault, i.e., the requested page is not in uncompressed memory area 15 shown in FIG. 1, the fault is turned over to the swap driver. The driver first determines whether the fault is a read or write fault as shown at 71. If the fault is a read fault, the driver checks page table 41 discussed above to determine if the page is stored in compressed memory as shown at 72. If the page is in compressed memory, the page is decompressed as shown at 73 and returned to the system as shown at 75. If the page is not in compressed memory, it must be on the disk. In this case, the page is read from the disk as shown at 74 and returned to the system. If the page was on the disk, it is scheduled for compression as shown at 77. The compression is carried out after the page is returned.

If the fault is a write fault, i.e., there was insufficient space for the page in question in the decompressed memory, the page is compressed as shown at 76. The driver then checks to see if there is sufficient free space in the linked list as shown at 80. If space exists, the compressed page is stored in the linked list as shown at 78. The page is stored as a chained array of buckets and the address of the first bucket in the chain is placed in the page table along with the other data discussed above. If there is insufficient space in the linked list, some of the pages stored in the list are returned to the disk as shown at 79. As discussed above, the least used pages are preferably shifted to disk.

In the preferred embodiment of the present invention, the amount of memory reserved for the compressed pages is allocated dynamically during runtime. The present invention requires some amount of memory to be carved out from the main memory of the computer for use as a compression memory. This reduces the amount of uncompressed memory that is available to hold uncompressed pages being utilized by the running programs. If the compressed memory is too large, more page swaps will be needed and performance will suffer because of the need to compress and decompress pages more often. If too little compressed memory is provided, then performance will suffer because the swap driver must swap some of the compressed files to disk. The dynamic allocation of compressed memory can be controlled by observing the number of page faults when more compressed memory is allocated. If the time lost to compression and decompression increases, the driver tries to reduce its compressed memory to free up uncompressed memory. When the compressed memory becomes too small, pages will be swapped to disk. By monitoring the time spent in swapping to disk and in compressing and decompressing pages, the driver can find the optimum memory allocation.

While the present invention does not require modifications to the operating system or the use of hardware accelerators, the present invention does not preclude either of these approaches. The compression algorithm of the present invention can be incorporated in the system kernel when the operating system is re-written. In addition, hardware compression accelerators can be utilized in conjunction with the swap driver of the present invention to further improve the performance of the present invention. Hence, the present invention is suitable for all modern operating systems including Microsoft's Windows NT and its variants, and various implementations of UNIX including but not limited to Linux, AIX, Ultrix, HP-UX, and Solaris.

The present invention also provides improved flexibility. Additional and/or improved compression algorithms can be added to the invention in the form of software upgrades to the swap driver without altering the underlying operating system kernel.

Various modifications to the present invention will become apparent to those skilled in the art from the foregoing description and accompanying drawings. Accordingly, the present invention is to be limited solely by the scope of the following claims.

What is claimed is:

1. A method of operating a data processing system having a main memory divided into memory pages, said data processing system having an operating system that sends page store commands specifying memory pages to be stored in a swap file and page retrieve commands specifying memory pages to be retrieved from said swap file and stored in said main memory, said method comprising the steps of:

providing compression code for converting one of said memory pages to a compressed memory page;

providing a swap driver for receiving operating system commands, said swap driver utilizing said compression code;

providing a compressed page region in said main memory for storing compressed memory pages; and providing a page table specifying the location of each compressed page and the page address corresponding to that page, wherein said swap driver compresses one of said memory pages specified in one of said page store commands to provide a corresponding compressed memory page and causes said compressed memory page to be stored in said compressed page region.

2. The method of claim 1 wherein said swap driver searches said page table for a page identified in one of said retrieve commands and causes that page to be moved to a corresponding area of main memory, said swap driver decompressing said page prior to said page being moved if said swap driver finds an entry in said page table indicating that said page is stored in said compressed page region.

3. The method of claim 1 wherein said compression code comprises a plurality of compression algorithms and wherein said swap driver determines which of said algorithms provides the most compression of one of said memory pages.

4. The method of claim 3 wherein said swap driver makes said determination by compressing a portion of that memory page using each of said compression algorithms.

5. The method of claim 3 wherein said page table further comprises data specifying the identity of said compression algorithm used to convert each compressed page.

6. The method of claim 1 wherein said swap driver determines if there is insufficient space in said compressed page region to store one of said compressed memory pages, and wherein said swap driver causes one of said compressed memory pages stored in said compressed page region to be moved to an auxiliary storage device in response to said determination indicating that insufficient space exists.

7. The method of claim 6 wherein said swap driver stores information relating to the number of times each compressed memory page in said compressed page region has been accessed, said swap driver using said information in determining which of said compressed memory pages is moved to said auxiliary storage device.

8. The method of claim 6 wherein said swap driver stores information relating to the last time each compressed page in said compressed page region was accessed, said swap driver using said information in determining which of said compressed memory pages is moved to said auxiliary storage device.

9. The method of claim 1 wherein said swap driver alters the size of said compressed page region during the execution of a program on said data processing system to provide faster program execution.

10. The method of claim 1 wherein said driver retrieves a memory page stored on an auxiliary storage device in response to a read fault communicated by said operating system, said driver returning said retrieved page to said operating system, wherein said driver compresses said retrieved page and stores said retrieved page in said compressed page region after returning said page to said operating system.

* * * * *